3,388,254
METHOD FOR DETERMINING THE AMOUNT OF CESIUM-137 IN IRRADIATED NUCLEAR FUEL

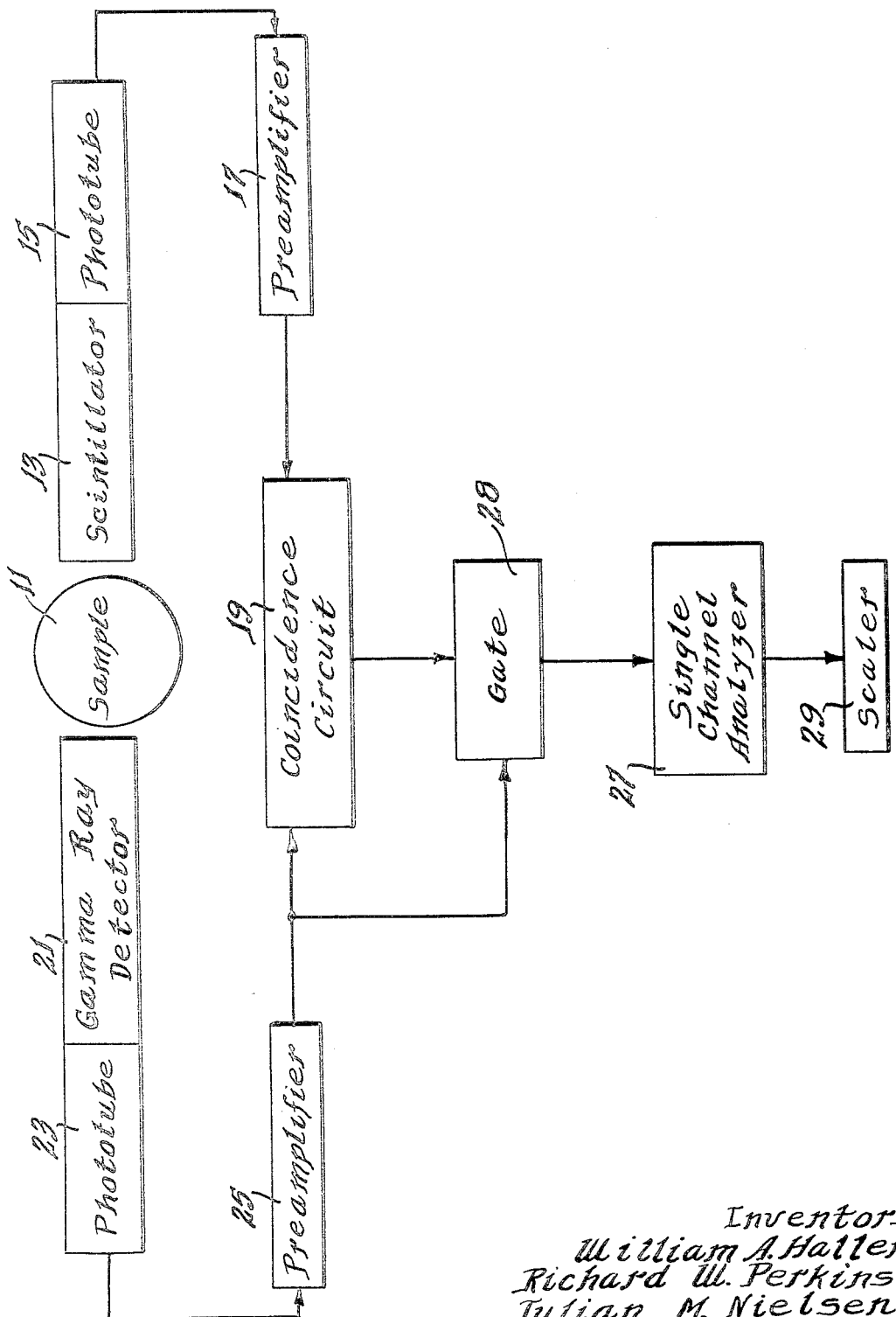

William A. Haller, Richard W. Perkins, and Julian M. Nielsen, Richland, Wash., assignors to the United States of America as represented by the United States Atomic Energy Commission
Filed Sept. 7, 1966, Ser. No. 577,776
2 Claims. (Cl. 250—83.3)

The invention described herein was made in the course of, or under, a contract with the United States Atomic Energy Commission.

This invention relates to a method for determining the percentage of burnup of nuclear reactor fuel which has been irradiated in a nuclear reactor. More specifically, it relates to a method for obtaining a fast and accurate determination of the amount of cesium-137 present in an irradiated nuclear reactor fuel.

Burnup is defined as a measure of nuclear reactor fuel consumption. It can be expressed as either the percentage of fuel atoms that have undergone fission or the amount of energy produced per unit weight of fuel initially present. In the latter case, it is usually expressed as megawatt-days per metric ton of fuel exposed.

The accurate determination of this burnup information is important in a number of ways. For example, such information is essential in the evaluation of nuclear reactor design, in order to determine efficient fuel utilization. Accurate burnup information is also necessary to which it was designed. The second supplies an independent measure of the dollar value of the expended fuel. Both are of economic importance. The first answers the question of whether the fuel produced the energy for which it was designed. The second supplies an independent measure of the dollar value of the expended fuel. This last has become very important as a means from which the charges for the use of the fuel in a reactor are determined.

The most widely used method for determination of burnup is a radiochemical method which involves the measurement of the amount of a given long-lived radioactive fission product present in an irradiated sample. If the given fission product can only have arisen from fission, and there has been no appreciable decay after irradiation or such decay can be corrected for, then the number of atoms of the given fission product constitutes a measure of the number of fissions which have taken place during irradiation.

The radioactive fission product most often used for this latter method is cesium-137 since it has a well-known decay scheme, a low capture cross section, a long half-life, a very low yield from cesium-136 by neutron capture, and a high fission yield which is accurately known.

However, there are certain problems associated with the radiochemical method which have a deleterious effect on the accuracy of the determination. In order that the gamma counts of cesium-137 may be determined accurately, it is essential that the cesium-137 be well separated from the other fission products present in the irradiated fuel element. This separation is carried out by a chemical process which must have a known and reproducible yield. The separation process necessarily involves several manipulations, each of which increases the chance for inaccuracy in the quantity of end product, which in turn affects the gamma count. Another problem present is that all manipulations must be carried out remotely because of the extremely high radioactivity of the irradiated fuel elements. This further increases the chance for an inaccurate end product and hence an inaccurate gamma count and, in addition, greatly increases the over-all cost of determining burnup.

One further problem associated with the radiochemical method of determining burnup by measurement of the amount of cesium-137 lies in the fact that cesium-134 is also a fission product, so that the chemical separation of cesium-137 from the irradiated fuel element will also separate the cesium-134. The problem then becomes one of distinguishing between the two cesium isotopes.

We have developed a method for determining the amount of cesium-137 present in irradiated nuclear reactor fuel which eliminates the problems associated with the chemical separation of cesium-137 from the other fission products found in irradiated nuclear reactor fuel. No complicated chemical separation procedures need be carried out and the only chemical process which is required is to dissolve the sample in an appropriate solvent and dilute it to a proper concentration to provide adequate beta and gamma counting.

It is accordingly an object of this invention to provide a method for the accurate determination of the burnup of irradiated nuclear reactor fuel.

It is a further object of this invention to provide an accurate method for the determination of the amount of cesium-137 present in a sample of irradiated nuclear reactor fuel.

It is a further object of this invention to provide a method for the determination of the amount of cesium-137 which requires a minimum of chemical processing and sample preparation.

Finally, it is an object of this invention to provide a method for the determination of the amount of cesium-137 which is relatively inexpensive and easy to use.

According to the principles of the present invention, advantage is taken of two facts: (1) of all of the long-lived radioactive fission products and the radioactive daughter products in their associated decay chains, only barium-137m emits a gamma ray without the concurrent emission of an associated beta particle, and (2) since barium-137m arises from the decay of its parent cesium-137, and since the half-life of barium-137m is relatively much shorter than that of cesium-137 (2.8 minutes for barium-137m; 30 years for cesium-137), the amount of barium-137m present in a sample at any given time may be taken as a measure of the amount of cesium-137 present. In the practice of the present invention, the rate of emission of those gamma rays not having an associated concident beta particle is taken as a measure of the amount of barium-137m, and therefore the amount of cesium-137, present. Since a small percentage of beta particles will necessarily go undetected, and the corresponding gamma ray will therefore be improperly counted as a noncoincident gamma ray, the accuracy of the result is improved by also discriminating against gamma rays of an energy which does not approximate 0.662 mev. which is the characteristic energy of the gamma emission from barium-137m.

The single figure of the drawing is a block diagram of a simple type of apparatus adapted to practice the method of this invention.

Referring to the drawing, beta particles emitted from fuel material sample 11 cause scintillations in a scintillator 13 which may be of a liquid, jell, or plastic type. The scintillations, which are proportional in intensity to the energy of the beta particles causing the scintillations, are detected by a conventional phototube 15 which converts the light energy of each scintillation into a corresponding electrical pulse. These pulses are amplified by a first preamplifier 17, and the amplified signal is fed into a coincident circuit 19.

Gamma rays emitted by fuel material sample 11 cause scintillations in a gamma ray detector 21 which may be a conventional NaI(Tl) crystal. These scintillations, which are proportional in intensity to the energy of the gamma rays causing the scintillations, are detected by a phototube 23 which converts the light energy of each scintillation into a corresponding electrical pulse. These pulses are amplified by a preamplifier 25 and are fed into the coincident circuit 19. The output pulses from preamplifier 25 are also fed to a single-channel analyzer 27 through a gate circuit 28.

The coincident circuit 19 operates in a well-known manner to compare the time relationship between those signals which it receives from the gamma ray detector and those signals which it receives from the beta particle detector and to produce at its output a gate blocking signal during such time as beta representative pulses and gamma representative pulses are being simultaneously received. The blocking signal controls the gate 21 so that only those noncoincident gamma signals for which there is not a matching beta signal are allowed to pass through gate 28 to the single-channel analyzer 27. Single-channel analyzer 27 is set to pass only those signals having an energy lying in a narrow band about the 0.662 mev. characteristic gamma energy level of barium-137m. The rate of occurrence of pulses at the output of analyzer 27 is then measured in any suitable manner, as for example by feeding them into the scaler 29 where they are counted for a known predetermined interval of time, and the count recorded.

The method of this invention might also be practiced without the single-channel analyzer 27, the noncoincident gamma signals being passed directly to the scaler 29 from the gate 28. However, by first passing the noncoincident gamma signals into the single-channel analyzer 27, the possibility of counting interfering noncoincident gamma representative pulses not arising from barium-137m decay is further decreased and correspondingly the accuracy of this method is further increased.

The counts recorded on the scaler 29 are representative of the amount of barium-137m which is present in the fuel sample. However, since the barium-137m is formed from the beta decay of cesium-137, and since barium-137m has a much shorter half-life than cesium-137, the amount of barium-137m present is proportional to the cesium-137 present in the sample being counted. Once the amount of cesium-137 present is known, the percent of burnup may be readily calculated by known methods.

To correct the count thus obtained to reflect the amount of cesium-137 which has been lost by decay since cessation of irradiation, the number of counts obtained may be divided by $e^{-\lambda t}$ to give the number of counts immediately following cessation of irradiation, $t$ being the time in seconds in seconds since irradation has ceased. If the time since irradiation has ceased is unknown, it may be determined by the method of assignee's copending application Ser. No. 513,861 filed Dec. 14, 1965 on a Method and Apparatus for Determining Cooling Age of Nuclear Reactor Fuel. The method of that invention uses an isotope with a long half-life, for example, cesium-137, and an isotope with a short half-life, for example cesium-134, and by determining the ratio of the amount of radiation present between the two isotopes, a determination of the period of time since irradiation has ceased may be made.

The theory of this invention may be more fully understood by consideration of the decay characteristics of cesium-137 which are unique among the long-lived fission products in that there is not a prompt beta-gamma coincidence when decay occurs.

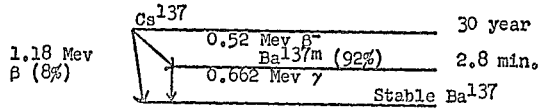

As can be seen from the above diagram, 92% of the cesium-137, which has a 30-year half-life, decays by emitting a beta particle to become metastable barium-137m which has a 2.8-minute half-life. The barium-137m in turn emits a characteristic 0.662 mev. gamma photon to become stable barium-137. It is the fact that all other radioactive long-lived fission products and the radioactive daughter products in their decay chain decay by simultaneous emission of a beta particle and an associated gamma ray in prompt coincidence that makes it possible to selectively measure barium-137m.

Because of the large quantities of fission products present in recently irradiated nuclear reactor fuel, the accuracy of the resulting count is improved if the fuel is properly aged before determination of the cesium-137 present in the sample. This allows the short half-life fission products present in the fuel to decay so that the radiation emanating from them will not interfere should their coincident beta go undetected. Irradiated reactor fuel which has aged for 8 months or more has been found to be sufficiently cooled to provide for accurate cesium-137 determination by the present method.

In a specific application of the invention, nitric acid solutions of natural uranium fuels which had cooled for 2 years, 1.3 years, and 8 months, respectively, were diluted to give final solutions of approximately 0.1 N nitric acid, and 50 microliters thereof were diluted with 19 ml. of a scintillating gel for counting.

The results for the 1.3 and 2.0-year-old fuels showed an accuracy to a standard deviation of 0.8% and 0.7%, respectively, of the cesium-137 after minor corrections for interference had been made. For the fuel which had been cooled for 8 months, a larger correction was required for interference from the zirconium-niobium-95 and for the ruthenium-103, which limited accuracy to about a 3% standard deviation.

The percent of burnup may be determined from the following standard formula

Percent Burnup=
$$\frac{\text{fissions/ml. solution}}{\text{initial fissionable atoms/ml. solution} + \text{fertile atoms/ml. solution}} \times 100$$

where the fissions per ml. are determined by calculation from the cesium-137 obtained by the method of this invention. The initial fissionable and fertile atoms per ml. are obtained by careful post-irradiation analysis to determine uranium and plutonium atoms per ml. to which are added the fissions per ml. as obtained above. By fissionable atom is meant an atom which fissions upon absorption of a slow neutron, for example uranium-235 or plutonium-239. A fertile atom is an atom which by capturing a neutron may be converted into a fissionable atom, for example uranium-238 or thorium-232.

The general principles described herein for measurement of cesium-137 also have utility for the measurement of manganese-54 (not a fission product) which has a decay characteristics similar to that of cesium-137. Manganese-54 as it decays emits only a gamma radiation without an accompanying beta particle and this is suitable for mesurement by the general principles described herein.

The formation of manganese-54 in iron by neutron capture of iron-54 provides an excellent monitor and is widely used for fast neutron flux measurement. A major problem in the use of manganese-54 for this purpose is that, in addition to the manganese-54 production from iron, iron-59 is formed and is often present at 100-fold higher concentration. The fact that the decay of iron-59 involves emission of two gamma rays of only somewhat higher energy than manganese-54 has required in the past that the iron-59 be carefully removed by chemical separation prior to the manganese-54 measurement by gamma-ray spectrometry. However, by using the principles described herein, it is possible to reduce the iron-59 interference by 95 to 98% and thus allow reasonably accurate measurements of the manganese-54 without prior chemical separation.

It is to be understood that the method of this invention is not to be limited to the details given herein but that it may be modified within the scope of the appended claims.

The embodiments of the invention in which an exclusive property or privilege is claimed are defined as follows:

1. In a method for determining the burnup of irradiated nuclear reactor fuel based on the amount of cesium-137 present in the irradiated fuel, the improvement in the method for determining the amount of cesium-137 present in the irradiated fuel, comprising: dissolving a representative portion of the irradiated fuel to obtain a sample thereof, detecting the beta particles emitted from said sample and generating beta representative electrical pulses corresponding thereto, detecting the gamma rays emitted from said sample and generating gamma representative electrical pulses corresponding thereto, eliminating those gamma representative pulses which are coincident in time with beta representative pulses, and measuring the rate of occurrence of the remaining gamma representative pulses.

2. The method of claim 1 wherein the gamma representative pulses which are generated have an amplitude corresponding to the energy of the corresponding gamma ray, and those gamma representative pulses not having an amplitude corresponding approximately to the 0.662 mev. energy characteristic of the gamma emission barium-137m are also eliminated prior to the final measuring step.

References Cited

Report IDO-16,925, Determination of Burnup of Reactor Fuel (1963).

Atomnaya Energia, 11, p. 454 (1961).

ARCHIE R. BORCHELT, *Primary Examiner.*